United States Patent Office 2,907,341
Patented Oct. 6, 1959

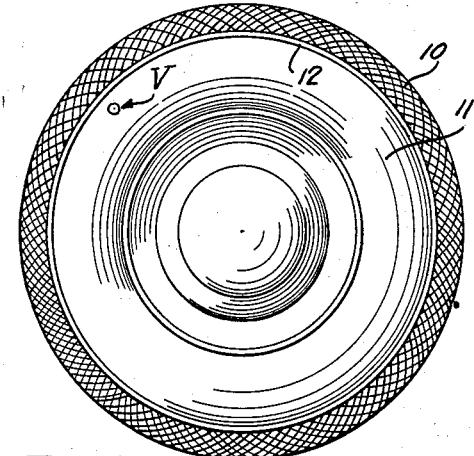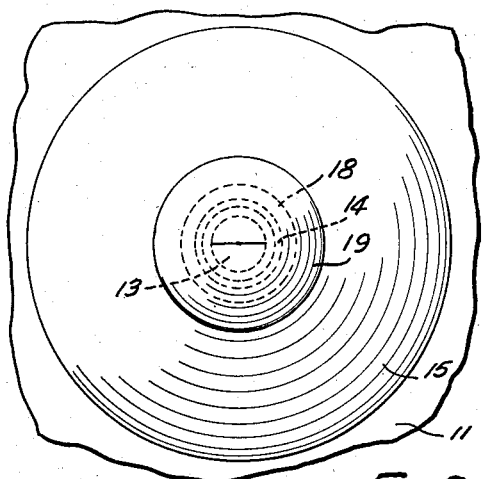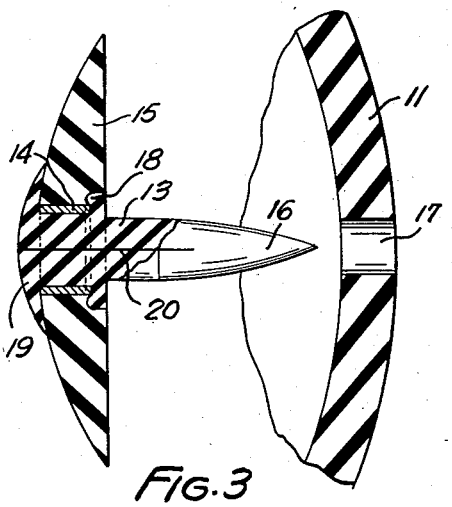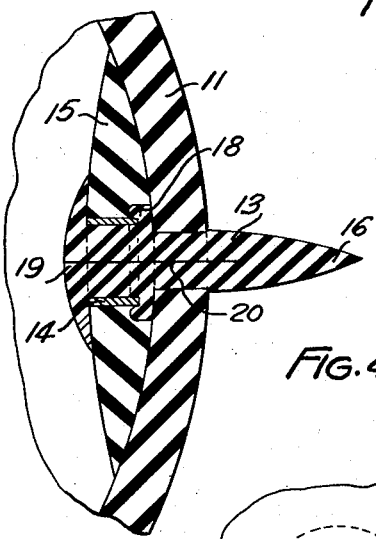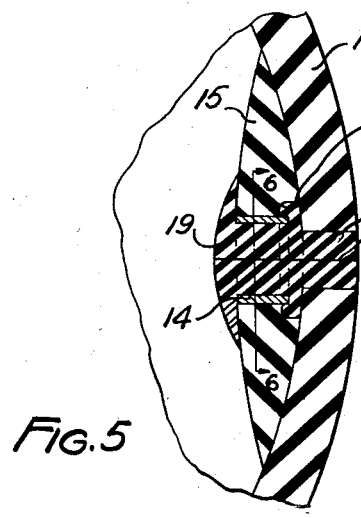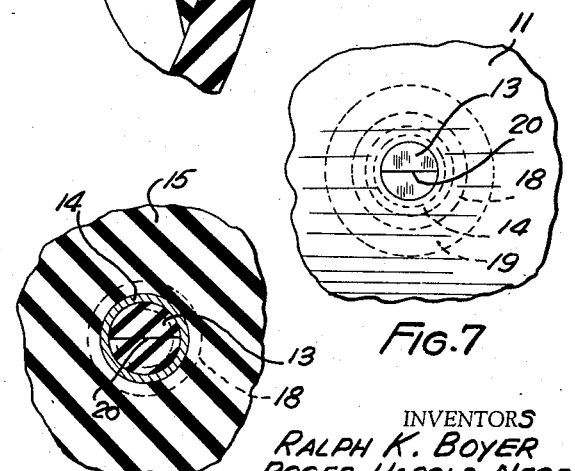
INVENTORS
RALPH K. BOYER
ROGER HAROLD NECE
ATTORNEYS

2,907,341

NEEDLE TYPE VALVE FOR INFLATABLE CONTAINER

Ralph K. Boyer, Cleveland, and Roger Harold Nece, Maple Heights, Ohio, assignors to The Dill Manufacturing Company, Cleveland, Ohio, a corporation of Ohio Application September 3, 1957, Serial No. 681,610

6 Claims. (Cl. 137—223)

This invention relates to a needle type valve for an inflatable container. Inasmuch as the valve embodying the invention has special utility with a pneumatic tire, which during use will be inflated, deflated, and gauged, the invention will be described in such environment. It will be understood, of course, that the needle type valve embodying the invention can be employed in connection with inflatable containers other than pneumatic tires.

Heretofore the tire industry has made efforts to develop a needle type valve for inflating, deflating, and gauging pneumatic tires. The needle type valve is located in the side wall of the tire. Usually the valve consists of a rubber plug having a knife-like slit extending axially through the plug. The plug is mounted in a hole of less diameter than the plug formed in the side wall of the tire prior to the curing of the latter. A difficulty encountered is that these valves tend to leak in actual use due to the flexing of the side wall of the tire in which the plugs are mounted. Also, there has been a tendency for the plugs to become displaced and be pushed into the tire or pulled out of the hole, particularly if unlubricated needles are used for the inflating, deflating, or gauging operations.

An object of the invention is to provide a needle type valve which can be mounted in the wall of an inflatable container, such as the side wall of a pneumatic tire, and will not leak during use, as it will not be affected by any flexing of the wall in which it is mounted.

Another object is to provide a needle type valve which is so constructed that the slit rubber plug of the valve is positively anchored against axial displacement into the container or outwardly thereof when the needle is inserted into or is withdrawn from the valve or from any other cause.

A further object is to provide a needle type valve which is of simple yet efficient construction and can be readily integrated with the wall of the inflatable container in which it is used.

The invention contemplates a needle type valve that includes a longitudinally slit rubber plug mounted in an opening in the wall of an inflatable container, but which plug is isolated from the wall and will not have its sealing portion affected by the flexing of the wall. The rubber plug is mounted in a rigid tube-like insert, which, in turn, is bonded to a rubber base which is vulcanized to the inner side of the wall of the container. In order to prevent axial displacement of the plug during the insertion or withdrawal of the needle or from other causes, the plug is provided with a head and a flange spaced axially of the plug from the head and engaging the opposite ends of the rigid insert.

Further and additional objects and advantages inherent in the invention will become apparent thereinafter during the following detailed description of an embodiment of the invention which is illustrated in the accompanying drawings forming part of this specification, and wherein:

Fig. 1 is a side elevational view of a motor vehicle wheel mounting a pneumatic tire in the side wall of which is located a needle type valve embodying the invention, the pneumatic tire being a white side wall tire for purposes of illustration;

Fig. 2 is a fragmentary elevational view, on a larger scale than Fig. 1, and is taken looking at the inner surface of that portion of the side wall of the tire in which the valve is mounted;

Fig. 3 is a sectional exploded view illustrating the needle type valve embodying the invention preparatory to the rubber plug of the valve being passed through the opening in the side wall of the tire during the mounting of the valve in the side wall prior to the vulcanization or curing of the tire;

Fig. 4 is a sectional view showing the needle type valve of the invention mounted in the side wall of the tire prior to the curing of the latter;

Fig. 5 is a view similar to Fig. 4, but illustrates the needle type valve mounted in the side wall of the tire after the latter is cured and with the outwardly extending end of the rubber plug of the valve removed by grinding or other suitable operation so as to have its outer end flush with the outer side of the side wall;

Fig. 6 is a fragmentary, sectional view taken substantially on line 6—6 of Fig. 5, looking in the direction of the arrows; and Fig. 7 is a fragmentary, outside elevational view of the side wall of the tire with the valve mounted therein, that is, a view looking at Fig. 5 from the right-hand side of the drawing.

Referring first to Fig. 1, a pneumatic tire 10 is shown mounted on a motor vehicle wheel. The tire 10, for illustrative purposes only, is of the type having a white side wall 11 separated from the tread portion of the tire by an annular scuff bar 12, usual in tires of this type. The needle type valve embodying the invention is mounted in the white side wall 11, as indicated at V.

The needle type valve of the invention comprises 3 elements; namely, a rubber plug 13; a rigid tubular insert 14; and a rubber base 15.

The rubber plug 13 is of an original length longer than is necessary to extend through an opening in the side wall of the tire and its end remote from the base 15 preferably is pointed, as indicated at 16. The rubber plug 13, when the valve is operatively mounted on the side wall 11 of the tire, extends through an opening 17 in the side wall which is of smaller diameter than the diameter of the plug 13 beyond the base 15. The hole 17 can be formed in the side wall in various ways as, for instance, by an awl, when the tire is in its uncured condition as will be understood in the art.

The portion of the rubber plug 13 that is located within the rubber base 15 is shown as of larger diameter than that portion of the plug located outwardly of the base 15, although, of course, such portions could be of the same diameter, if desired.

The portion of the rubber plug 13 within the rubber base 15 includes an annular radially extended flange 18 having its right-hand surface flush with the right-hand planar surface of the base 15, as viewed in Fig. 3. The rigid tubular insert 14, formed of brass or other suitable rigid material, is mounted on the portion of the rubber plug 13 within the base 15 and has its right-hand end, as viewed in the drawing, engaged with the flange 18, while its left-hand end engages an enlarged head 19 formed on the end of the plug 13 and contacting the left-hand or convex surface of the rubber base 15. The left-hand or convex surface of the base 15 and the contour of the plug 19 are blended to form a substantially smooth convex surface which will not injure the air bag used in curing the tire.

The rubber plug 13 is provided with a diametral axially-extending slit 20 which is of a length to extend through the head 19 and the plug a substantial distance toward the pointed end 16 thereof beyond the base 15. The slit 20 is, of course, for the purpose of receiving the needle during the inflating, deflating, or gauging of the tire, as will be well understood in the art. The rigid insert 14 with the rubber plug 13 mounted therein, as indicated in Fig. 3, is bonded to the rubber base 15.

The valve formed of the rubber plug 13, rigid insert 14, and rubber base 15 is mounted in and on the side wall 11 of the tire before the latter is cured by passing the pointed end 16 of the plug through the opening 17 and drawing the plug through the opening until the planar side of the base 15 engages the inner surface of the side wall 11 of the tire. Preferably, the planar side of the base 15 will be cemented to the inner surface of the side wall 11 when the valve is thus mounted. In passing or drawing the plug 13 through the opening 17, pliers can be used to complete the operation, and until the parts are in the position indicated in Fig. 4. The portion of the rubber plug 13 which now extends beyond the outer surface of the side wall of the tire is then cut off so the outer end of the plug will be approximately flush with said outer surface of the side wall of the tire. The tire with the valve assembly thus mounted is then cured by vulcanization and the valve is integrated with the side wall, as will be understood in the art. When the curing operation is completed the outer surface of the side wall of the tire is buffed and the buffing operation causes the outer end of the rubber plug 13 to become absolutely flush with the outer surface of the side wall of the tire, as clearly indicated in Fig. 5.

As shown in Figs. 5 to 7 inclusive, the slit rubber plug 13 is locked in the rigid insert 14 and said insert, plug and rubber base 15 are integrated with the tire. The rigid insert 14 isolates the major part of the slit air sealing portion of the plug 13 from the side wall of the tire so that any flexing of the side wall during the use of the tire will not affect the sealing function of the slit rubber plug 13 and a leaky valve is avoided. In this connection, it should be noted that should the flexing of the side wall of the tire affect its connection to the portion of the plug 13 within the opening 17, no leaks would result, inasmuch as the flange 18 and base 15 are vulcanized to the inner surface of the side wall in the tire.

It will be noted that insertion of a needle into the slit 20 of the plug for inflating, deflating, or gauging operations cannot act to move the plug axially inwardly due to the positive stop provided by the flange 18. Also, it will be noted that withdrawal of the needle cannot act to displace the plug outwardly because of the head 19 and in addition, because the flange 18 engages the inner surface of the side wall of the tire. Consequently, the plug 13 is held positively against axial displacement in either direction, whether by the insertion or withdrawal of the needle or by some other cause. Also, all likelihood of the plug blowing out of the tire due to air pressure is eliminated.

The needle valve construction embodying the invention can be installed in one operation at no more cost or greater time or greater difficulty than in mounting the usual rubber plug directly in the hole in the side wall and then curing the tire.

Although a preferred embodiment of the invention has been illustrated and described herein, it will be understood that the invention is susceptible of various modifications and adaptations coming within the scope of the appended claims.

Having thus described our invention, we claim:

1. In combination with a wall of an inflatable container having an opening therethrough and a needle type valve mounted in said opening, a rubber base having a side surface secured to the inner surface of said wall of the container, a rigid tubular insert centrally mounted in an aperture through said base and bonded thereto, and a rubber plug secured in said insert and extending through said base and having a portion extending from said side surface of the base through and tightly interfitting the opening in the wall of the container, said plug having a diametral slit extending from the end of said plug within the said base through said portion to a location on the outer side of the container wall when said portion extends through the opening.

2. In the combination as defined in claim 1 wherein said plug is provided with means cooperating with said insert and maintaining said plug against axial displacement relative to said insert and said base.

3. In the combination as defined in claim 1 and wherein said plug is provided with a radially extending flange engaging one end of said insert and with an enlarged head engaging the other end of said insert and a side surface of said base that is opposite to said side surface.

4. In the combination as defined in claim 3 and wherein said flange is embedded in said base and has a planar surface flush with said first mentioned side surface of said base.

5. In the combination as defined in claim 3 and wherein the second mentioned side surface of said base is convex and said head has one side surface thereof engaging said convex surface of said base and an opposite surface thereof of convex configuration and substantially merging with the convex side surface of said base.

6. In the combination as defined in claim 1 and wherein said portion of said plug is of a length to project through the opening in the container wall beyond the latter to facilitate the mounting of said portion in the opening and provide an excess length for subsequent removal to make the outer end of said plug portion flush with the outer surface of the wall of the container.

References Cited in the file of this patent

UNITED STATES PATENTS

| | | |
|---|---|---|
| 2,071,213 | Perry | Feb. 16, 1937 |
| 2,318,115 | Tubbs | May 4, 1943 |
| 2,625,398 | Robinson | Jan. 13, 1953 |

FOREIGN PATENTS

| | | |
|---|---|---|
| 426,786 | Great Britain | Apr. 10, 1935 |